US008653450B2

(12) United States Patent
Wright et al.

(10) Patent No.: US 8,653,450 B2
(45) Date of Patent: Feb. 18, 2014

(54) MICROENGINEERED MULTIPOLE ION GUIDE

(71) Applicant: Microsaic Systems PLC, Woking (GB)

(72) Inventors: Steven Wright, Horsham (GB); Shane Martin O'Prey, London (GB)

(73) Assignee: Microsaic Systems PLC, Woking, Surrey (GB)

( * ) Notice: Subject to any disclaimer, the term of this patent is extended or adjusted under 35 U.S.C. 154(b) by 0 days.

(21) Appl. No.: 13/939,623

(22) Filed: Jul. 11, 2013

(65) Prior Publication Data

US 2013/0299695 A1 Nov. 14, 2013

Related U.S. Application Data

(63) Continuation of application No. 13/053,914, filed on Mar. 22, 2011, now Pat. No. 8,507,847.

(51) Int. Cl.
*B01D 59/44* (2006.01)

(52) U.S. Cl.
USPC ............................ 250/283; 250/281; 250/282

(58) Field of Classification Search
None
See application file for complete search history.

(56) References Cited

U.S. PATENT DOCUMENTS

| | | | | |
|---|---|---|---|---|
| 4,290,061 | A * | 9/1981 | Serrano | 345/174 |
| 5,572,035 | A * | 11/1996 | Franzen | 250/396 R |
| 5,574,561 | A * | 11/1996 | Boudreau et al. | 356/399 |
| 5,719,393 | A * | 2/1998 | Chutjian et al. | 250/292 |
| 5,852,294 | A * | 12/1998 | Gulcicek et al. | 250/292 |
| 6,025,591 | A * | 2/2000 | Taylor et al. | 250/292 |
| 6,107,745 | A * | 8/2000 | Mougin et al. | 315/169.1 |
| 6,329,654 | B1 * | 12/2001 | Gulcicek et al. | 250/293 |
| 6,441,370 | B1 * | 8/2002 | Khosla et al. | 250/292 |
| 6,639,234 | B1 * | 10/2003 | Badura et al. | 250/492.3 |
| 6,759,651 | B1 * | 7/2004 | Li | 250/288 |
| 6,926,783 | B2 * | 8/2005 | Loucks, Jr. | 156/73.6 |
| 6,972,406 | B2 * | 12/2005 | Syms | 250/281 |
| 7,176,455 | B1 * | 2/2007 | Whitehouse et al. | 250/288 |
| 7,351,963 | B2 * | 4/2008 | Rebettge et al. | 250/292 |
| 7,411,187 | B2 * | 8/2008 | Monroe et al. | 250/290 |
| 2002/0005479 | A1 * | 1/2002 | Yoshinari et al. | 250/288 |
| 2002/0089638 | A1 * | 7/2002 | Ho et al. | 349/161 |
| 2003/0075790 | A1 * | 4/2003 | Steinberg et al. | 257/686 |
| 2003/0173515 | A1 * | 9/2003 | Tong | 250/292 |
| 2003/0224559 | A1 * | 12/2003 | Gross | 438/128 |
| 2005/0077897 | A1 * | 4/2005 | Syms | 324/318 |
| 2005/0258364 | A1 * | 11/2005 | Whitehouse et al. | 250/292 |
| 2006/0272149 | A1 * | 12/2006 | Steinberg et al. | 29/834 |
| 2007/0057172 | A1 * | 3/2007 | Wang | 250/281 |
| 2008/0191132 | A1 * | 8/2008 | Boyle et al. | 250/287 |
| 2009/0026361 | A1 * | 1/2009 | Syms et al. | 250/281 |
| 2009/0140135 | A1 * | 6/2009 | Finlay | 250/281 |
| 2010/0096541 | A1 * | 4/2010 | Okumura et al. | 250/281 |
| 2011/0049360 | A1 * | 3/2011 | Schoen | 250/290 |

* cited by examiner

*Primary Examiner* — Andrew Smyth
(74) *Attorney, Agent, or Firm* — Bishop Diehl & Lee, Ltd.

(57) ABSTRACT

A microengineered multipole ion guide for use in miniature mass spectrometer systems is described. Exemplary methods of mounting rods in hexapole, octupole, and other multipole geometries are described. The rods forming the ion guide are supported by etched silicon structures provided on first and second substrates.

25 Claims, 6 Drawing Sheets

MICROENGINEERED MULTIPOLE ION GUIDE

CROSS-REFERENCE TO RELATED APPLICATIONS

This application is a continuation of U.S. patent application Ser. No. 13/053,914 filed on Mar. 22, 2011, which claims priority to Great Britain Patent Application No. GB1005551.5, filed Apr. 1, 2010.

TECHNICAL FIELD OF THE INVENTION

The present application relates to ion guides. The invention more particularly relates to a multipole ion guide that is microengineered and used in mass spectrometer systems as a means of confining the trajectories of ions as they transit an intermediate vacuum stage. Such an intermediate vacuum stage may typically be provided between an atmospheric pressure ion source (e.g. an electrospray ion source) and a mass analyser in high vacuum.

BACKGROUND OF THE INVENTION

Atmospheric pressure ionisation techniques such as electrospray and chemical ionisation are used to generate ions for analysis by mass spectrometers. Ions created at atmospheric pressure are generally transferred to high vacuum for mass analysis using one or more stages of differential pumping. These intermediate stages are used to pump away most of the gas load. Ideally, as much of the ion current as possible is retained. Typically, this is achieved through the use of ion guides, which confine the trajectories of ions as they transit each stage.

In conventional mass spectrometer systems, which are based on components having dimensions of centimeters and larger, it is known to use various types of ion guide configurations. These include multipole configurations. Such multipole devices are typically formed using conventional machining techniques and materials. Multipole ion guides constructed using conventional techniques generally involve an arrangement in which the rods are drilled and tapped so that they may be held tightly against an outer ceramic support collar using retaining screws. Electrical connections are made via the retaining screws using wire loops that straddle alternate rods. However, as the field radius decreases, and/or the number of rods used to define the multipole increases, problems associated with such conventional techniques include the provision of a secure and accurate mounting arrangement with independent electrical connections.

SUMMARY OF THE INVENTION

These and other problems are addressed in accordance with the present teaching by providing an ion guide which can be fabricated in accordance with microengineering principles. Accordingly, a first embodiment of the application provides a microengineered multipole rod assembly as detailed in claim 1. Advantageous embodiments are provided in the dependent claims.

BRIEF DESCRIPTION OF THE DRAWINGS

The present application will now be described with reference to the accompanying drawings in which.

DETAILED DESCRIPTION OF THE DRAWINGS

Figure 1:
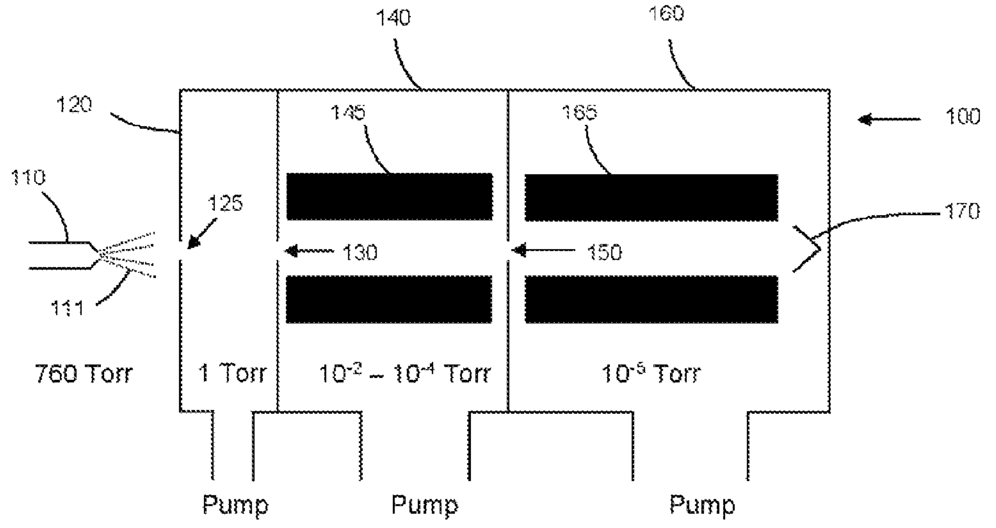
FIG. 1 shows a schematic representation of an exemplary microengineered mass spectrometer system incorporating an ion guide in the second vacuum chamber, in accordance with the present teaching.

FIG. 1 shows in schematic form an example of a mass spectrometer system 100 in accordance with the present teaching. An ion source 110, such as an electrospray ion source, effects generation of ions 111 at atmospheric pressure. In this exemplary arrangement, the ions are directed into a first chamber 120 through a first orifice 125. The pressure in this first chamber is of the order of 1 Torr. A portion of the gas and entrained ions that passes into the first chamber 120 through orifice 125 is sampled by a second orifice 130 and passes into a second chamber 140, which is typically operated at a pressure of $10^{-4}$ to $10^{-2}$ Torr. The second orifice 130 may be presented as an aperture in a flat plate or a cone. Alternatively, a skimmer may be provided proximal to or integrated with the entrance to the second chamber so as to intercept the initial free jet expansion. The second chamber, or ion guide chamber, 140 is coupled via a third orifice 150 to an analysis chamber 160, where the ions may be filtered according to their mass-to-charge (m/z) ratio using, for example, a quadrupole mass filter 165, and then detected using a suitable ion detector 170. It will be appreciated by those of skill in the art that other types of mass analyser, including magnetic sector and time-of-flight analysers, for example, can be used instead of a quadrupole mass filter. It will be understood that the ion guide chamber 140 is an intermediate chamber provided between the atmospheric pressure ion source 110 and the mass analysis chamber 160, albeit downstream in this instance of a first chamber.

The quantity of gas pumped through each vacuum chamber is equal to the product of the pressure and the pumping speed. In order to use pumps of a modest size throughout (the pumping speed is related to the physical size of the pump), it is desirable to pump the majority of the gas load at high pressure and thereby minimise the amount of gas that must be pumped at low pressure. Most of the gas flow through the first orifice 125 is pumped away via the first chamber 120 and second chamber 140, as a result of their relatively high operating pressures, and only a small fraction passes through the third orifice 150 and into the analysis chamber, where a low pressure is required for proper operation of the mass filter 165 and detector 170.

In order to transfer as much of the ion current as possible to the analysis chamber, the second chamber includes a multipole ion guide 145 which acts on the ions but has no effect on the unwanted neutral gas molecules. Such an ion guide is provided by a multipole configuration comprising a plurality of individual rods arranged circumferentially about an intended ion path, the rods collectively generating an electric field that confines the trajectories of the ions as they transit the second chamber. The number of rods employed in the multipole configuration determines the nomenclature used to define the configuration. For example, four rods define a quadrupole, six rods define a hexapole and eight rods define an octupole. The voltage applied to each rod is required to oscillate at radio frequency (rf), with the waveforms applied to adjacent rods having opposite phase. Quadrupole mass filters are operated with direct current (dc) components of equal magnitude but opposite polarity added to the out-of-phase rf waveforms. When the magnitude of the dc components is set appropriately, only ions of a particular mass are transmitted. However, the ion guide is operable without such dc components (rf only), and all ions with masses within a range defined by the rf voltage amplitude are transmitted.

It will be appreciated that at a first glance, a quadrupole ion guide seems to be somewhat structurally similar to a pre-filter, which is used to minimise the effects of fringing fields at the entrance to a quadrupole mass filter. However, a pre-filter must be placed in close proximity to the mass filtering quadrupole 165 without any intermediate aperture i.e. it does not transfer ions from one vacuum stage to another.

It will be understood that within the second chamber, if the pressure is high enough, collisions with neutral gas molecules cause the ions to lose energy, and their motion can be approximated as damped simple harmonic oscillations (an effect known as collisional focusing). This increases the transmitted ion current as the ions become concentrated along the central axis. It is known that this effect is maximised if the product of the pressure and the length of the ion guide lies between $6\times10^{-2}$ and $15\times10^{-2}$ Torr-cm. It follows that a short ion guide allows the use of higher operating pressures and consequently, smaller pumps.

Figure 2:
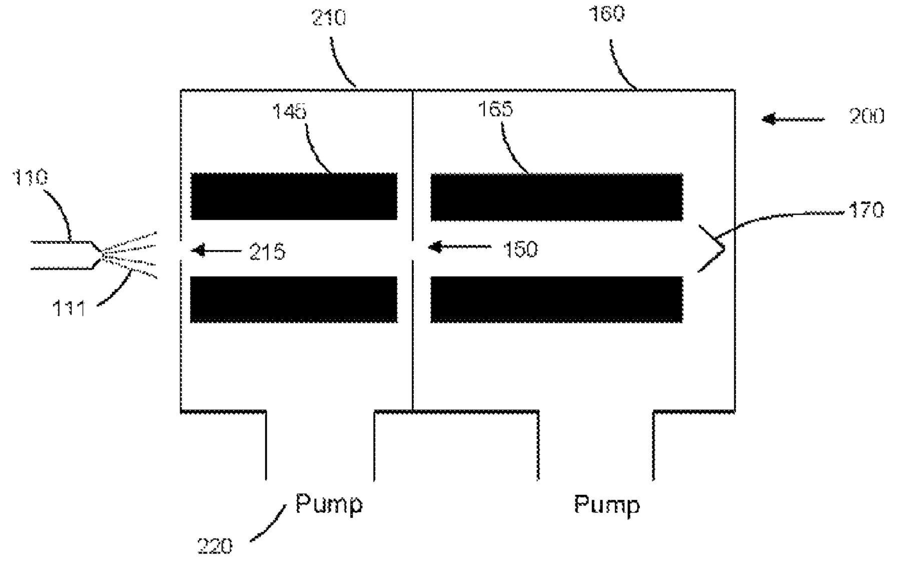
FIG. 2 shows a schematic representation of an exemplary microengineered mass spectrometer system incorporating an ion guide in the first vacuum chamber, in accordance with the present teaching.

FIG. 2 shows in schematic form a second example of a mass spectrometer system 200 in accordance with the present teaching. In this arrangement there are only two vacuum chambers and the multipole ion guide 145 acts on the ions directly after they pass through the first orifice 215. It is again accommodated in an intermediate chamber 210 between the ion source 110 and the vacuum chamber 160 within which the mass analyser 165 is provided. The size of the first orifice 215, the second orifice 150, and the pump 220 are chosen to limit the gas flow into the analysis chamber 160.

In accordance with the present teaching, the multipole ion guide that provides confinement and focusing of the ions typically has critical dimensions similar to that of the microengineered quadrupole filter provided within the analysis chamber. As both the ion guide and the mass filter are of a small scale, they may be accommodated in vacuum chambers that are smaller than those used in conventional systems. In addition, the pumps may also be smaller, as the operating pressures tolerated by these components are higher than those used in conventional systems.

Figure 3:
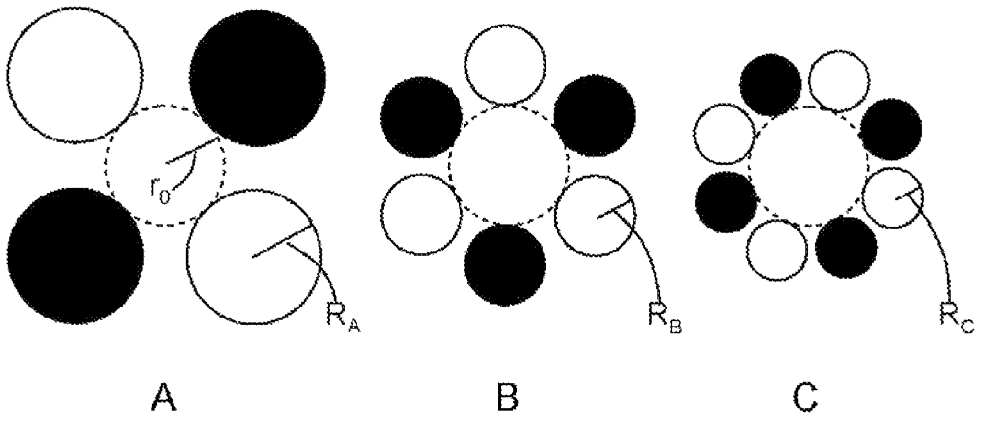
FIG. 3 shows how with increasing number of rods within a multipole geometry the radius of the individual rods may decrease.

It is reasonable to consider a fixed field radius, $r_0$, which might be determined, for example, by the diameter of the second orifice 130 in FIG. 1, or the radial extent of the free jet expansion emanating from the first orifice 215 in FIG. 2. In FIG. 3, it can be seen that as more rods are used to define the multipole, the radius of each rod, R, becomes smaller such that $R_C$ in the octupole configuration (FIG. 3C) is smaller than $R_B$ in the hexapole configuration (FIG. 3B), which is smaller than $R_A$ in the quadrupole configuration (FIG. 3A). As the rf waveforms applied to adjacent rods must have opposite phase, electrical connections to the rods are made in two sets (indicated by the black and white circles in FIG. 3). Microengineering techniques provide a means of accurately forming independent sets of rod mounts with the required electrical connections.

Figure 4:
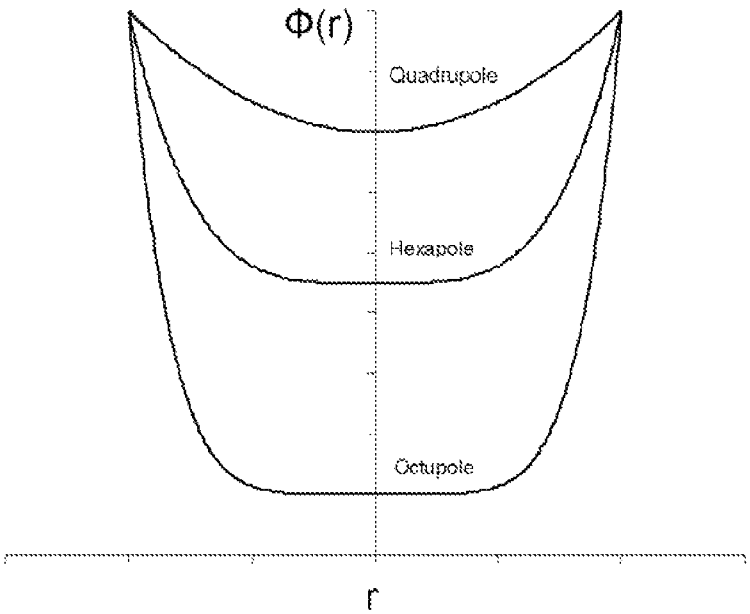
FIG. 4 shows pseudopotential wells for each of a quadrupole, hexapole and octupole geometry.

Although the electric field within the multipole ion guide oscillates rapidly in response to the rf waveforms applied to the rods, the ions move as if they are trapped within a potential well. The trapping pseudopotentials can be described using $$\Phi(r) = \frac{n^2 z^2 V_0^2}{4m\Omega^2 r_0^2}\left(\frac{r}{r_0}\right)^{2n-2}$$

where 2n is the number of poles, r is the radial distance from the centre of the field, $r_0$ is the inscribed radius, $V_0$ is the rf amplitude, z is the charge, Ω is the rf frequency, and m is the mass of the ion [D. Gerlich, J. Anal. At. Spectrom. 2004, 19, 581-90]. The required pseudopotential well depth is dictated by the need to confine the radial motion of the ions, and should be at least equal to the maximum radial energy. It follows that miniaturisation, which leads to a reduction in the inscribed radius, results in a reduction in the required rf amplitude. FIG. 4 shows how the potential, Φ(r), generated by quadrupole, hexapole, and octupole geometries varies with the radial distance from the centre of the field, with the same mass, charge, inscribed radius and rf amplitude used in each case. It can be seen that the pseudopotential well established by a hexapole or an octupole is much deeper and has a flatter minimum than the pseudopotential well established by a quadrupole. Compared with quadrupole ion guides, hexapole and octupole ion guides can retain higher mass ions for a given rf amplitude, or alternatively, require smaller rf amplitudes to establish a particular pseudopotential well depth. Octupoles and, to a lesser extent, hexapoles can accommodate more low energy ions than quadrupoles by virtue of their flatter minima, but the absence of any restoring force near their central axes limits their ability to focus the ion beam. Hexapole ion guides may offer the best compromise between ion capacity and beam diameter.

In summary, advantages of employing a miniature multipole ion guide include:

(i) The overall size of this component is consistent with a miniature mass spectrometer system in which other components are also miniaturised.

(ii) The rf amplitude required to establish a particular pseudopotential well depth is reduced. This increases the range of pressures that can be accessed without initiation of an electrical discharge. In this respect, hexapoles and octupoles are advantageous over quadrupoles.

(iii) A higher pressure may be tolerated if the ion guide is short. Consequently, smaller pumps can be used, which allows the overall instrument dimensions to be reduced.

Figure 5:
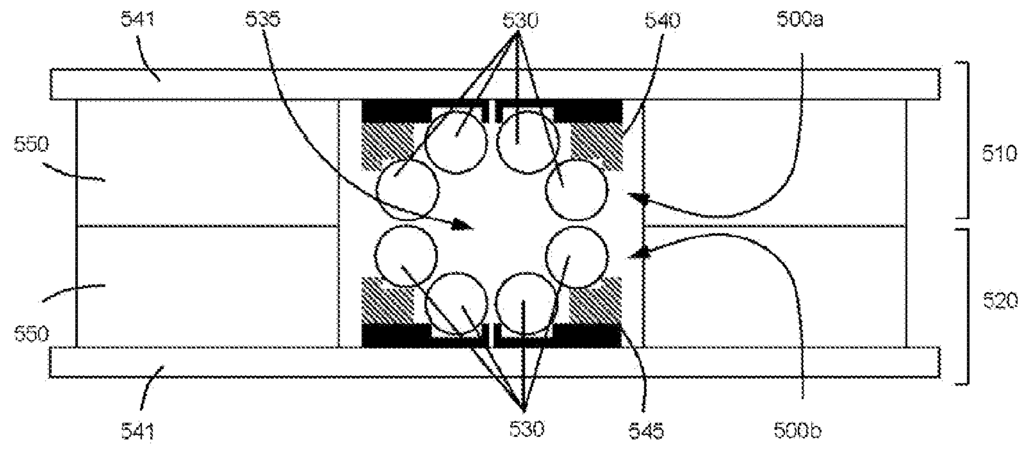
FIG. 5 shows an exemplary octupole mounting arrangement.

FIG. 5 shows an exemplary mounting arrangement for such a multipole configuration. Within the context of microengineering, it will be appreciated that some form of etch or other silicon processing technique will typically be required to fabricate the structure. In this arrangement, shown with reference to an exemplary octupole configuration, two sets 500*a*, 500*b* of rods are accommodated on first 510 and second 520 dies, respectively. Each set comprises four rods 530, totaling the eight rods of the octupole. The rods are operably used to generate an electric field, and as such are conductors. These may be formed by solid metal elements or by some composite structure such as a metal coated insulated core. The rods are arranged circumferentially about an intended ion beam axis 535. The rods are seated and retained against individual supports 540, 545. In this exemplary arrangement, each of the sets of rods 500*a*, 500*b* comprises four rods arranged such that two rods are located close to the supporting substrate 541 and two rods are located further away. Consequently, when the first 510 and second 520 dies are brought together, the eight rods comprising the complete multipole configuration are positioned such that their axes are located on four planes parallel to the supporting substrates.

The supports are desirably fabricated from silicon bonded to a glass substrate 541, a support for a first rod being electrically isolated from a support for a second adjacent rod. Each of the supports may differ geometrically from others of the supports so as to allow for lateral and vertical displacements of the rods supported on the same substrate, relative to one another. Desirably, however, a support for one rod is a mirror image of a support for another rod. While the rods will be parallel with one another and also with an ion beam axis of the device, each of the rods may differ from others of the rods in its spacing relative to the supporting substrate. When mounting the rods, the first and second dies are separated to allow the location of the rods on their respective supports. On effecting a securing of the rods, the two dies are brought together and located relative to one another to form the desired ultimate configuration. Desirably, the two supporting substrates are identical, so that following assembly, the relative spacings of the rods mounted on the lower substrate are the same as the relative spacings of the rods mounted on the upper substrate. The mutual spacing of the first and second dies is desirably effected using precision spacers 550.

Figure 6:
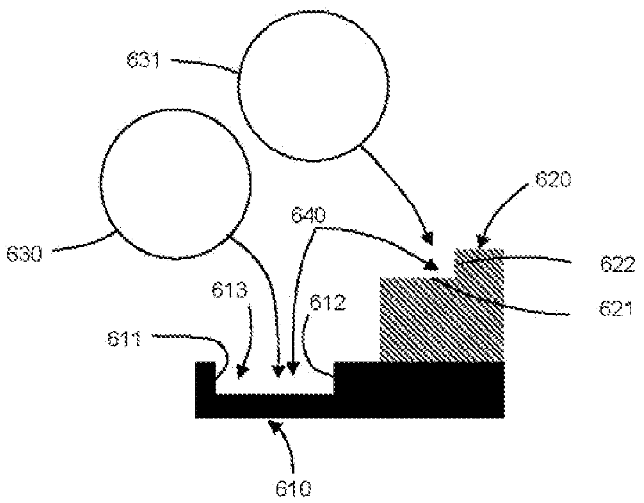
FIG. 6 shows in more detail the individual mounts of FIG. 5.

FIG. 6 shows how the supports may be configured to define different mounting arrangements dependent on the ultimate location of the seated rods. A trench configuration 610 is used to support a first rod whereas a step configuration 620 is used to support a second rod. As is evident from FIG. 6, the trench differs from the step in that it employs first 611 and second 612 walls defining a channel 613 therebetween within which a rod 630 is located. The rod on presentation to the trench is retained by both the first and second walls, with additional securing being achieved through, for example, use of an adhesive 640. With the step configuration, a tread portion 621 and riser portion 622 are provided and a rod 631 is seated against and secured against both. This securing again desirably employs use of an adhesive 640 for permanent location of the rod at the desired location. This adhesive is desirably of the type providing electrical conduction so as to ensure a making of electrical connections between the supports and the rods.

Figure 7:
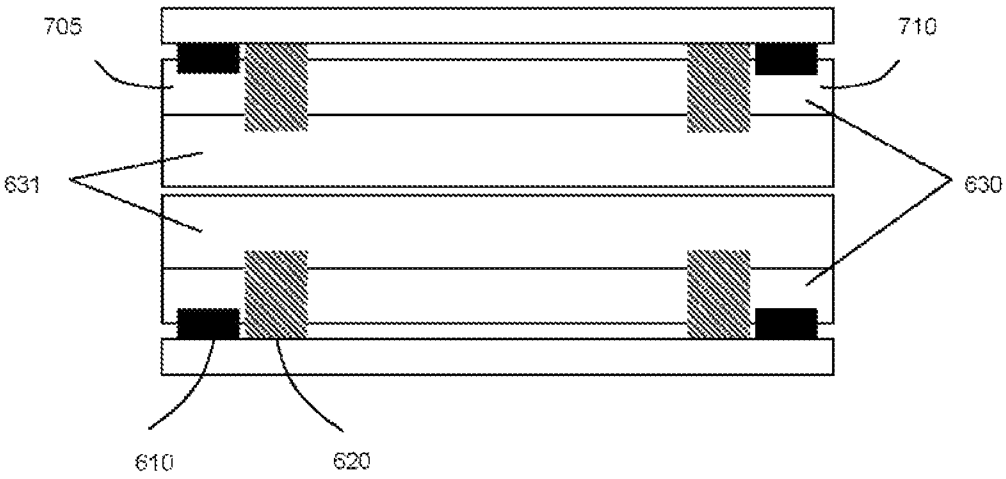
FIG. 7 shows a side view of the arrangement of FIG. 5 with the precision spacers removed to reveal the axial displacement of the rod mounts.

As shown in FIG. 7, to provide for the electrical isolation between the individual rods, each of the step and trench supports are desirably spaced from one another along the longitudinal axis of the rods. It is also apparent from the side view presented in FIG. 7 that the rods 630, 631 do not necessarily require support along their entire length, rather support at first 705 and second 710 ends thereof should suffice.

It will be appreciated that to provide the necessary circumferential location of the plurality of rods about the ion beam axis that desirably the heights of the individually mounted rods will be staggered. In an octupole configuration such as that shown, each set of rods comprises two rod pairings. The individual rod parings comprise two rods that are separately mounted on identical supports. A first pairing comprises two rods each provided in their own trench support. A second pairing comprises two rods each provided on a step support. The heights of the step supports are greater than that of the trench supports such that on forming the ion guide construct, those rods seated on the steps are elevated relative to those within the trenches. In this way the step rods are closer to the opposing substrate than the trench rods.

Figure 8:
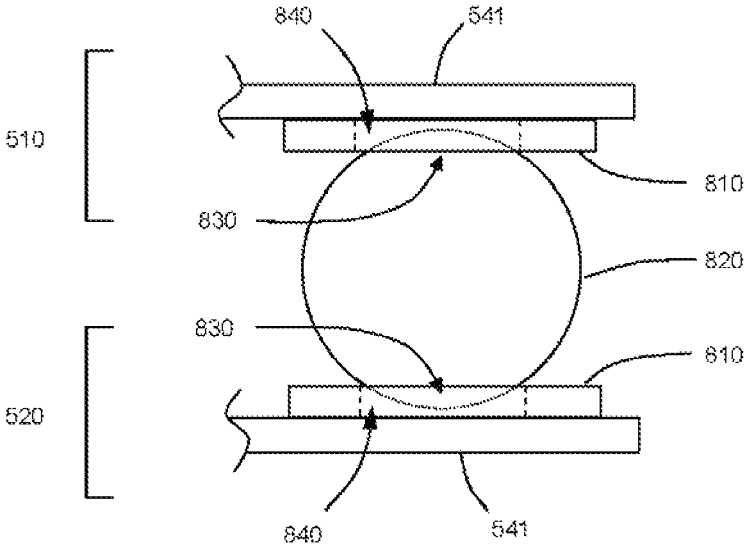
FIG. 8 shows an exemplary precision spacer that maintains the correct separation and registry between the two dies.

An exemplary precision spacer that maintains the correct separation and registry between the two dies is shown in FIG. 8. A ball 820 seated in sockets 830 determines the separation between the dies 510, 520, and prevents motion in the plane of the dies. The ball can be made from ruby, sapphire, aluminium nitride, stainless steel, or any other material that can be prepared with the required precision. The sockets are formed by etching of the pads 810 bonded to the substrates 541, such that a cylindrical core is removed from their centres. Adhesive may be deposited in the voids 840 to secure the balls and make the assembled structure rigid.

In general, a component in an assembly has three orthogonal linear and three orthogonal rotational degrees of freedom relative to a second component. It is the purpose of a coupling to constrain these degrees of freedom. In mechanics, a coupling is described as kinematic if exactly six point contacts are used to constrain motion associated with the six degrees of freedom. These point contacts are typically defined by spheres or spherical surfaces in contact with either flat plates or v-grooves. A complete kinematic mount requires that the point contacts are positioned such that each of the orthogonal degrees of freedom is fully constrained. If there are any additional point contacts, they are redundant, and the mount is not accurately described as being kinematic. However, the terms kinematic and quasi-kinematic are often used to describe mounts that are somewhat over-constrained, particularly those incorporating one or more line contacts. Line contacts are generally defined by arcuate or non-planar surfaces, such as those provided by circular rods, in contact with planar surfaces, such as those provided by flat plates or v-grooves. Alternatively, an annular line contact is defined by a sphere in contact with a cone or the surfaces that define an aperture such as a circular aperture.

A dowel pin inserted into a drilled hole is a common example of a coupling that is not described as kinematic or quasi-kinematic. This type of coupling is usually referred to as an interference fit. A certain amount of play or slop must be incorporated to allow the dowel pin to be inserted freely into the hole during assembly. There will be multiple contact points between the surface of the pin and the side wall of the mating hole, which will be determined by machining inaccuracies. Hence, the final geometry represents an average of all these ill-defined contacts, which will differ between nominally identical assemblies.

Desirably, the precision spacers defining the mutual separation of the two dies in FIG. 5 also serve to provide a coupling between the two dies that is characteristic of a kinematic or quasi-kinematic coupling, in that the engagement surfaces define line or point contacts. It will be appreciated that the ball and socket arrangement is representative of such a preferred coupling that can be usefully employed within the context of the present teaching. In the case of a ball and socket, an annular line contact is defined when the components engage. However, it will be understood that other arrangements characteristic of kinematic or quasi-kinematic couplings are also suitable. These include, but are not limited to arrangements in which point contacts are defined by spherical elements in contact with plates or grooves, or arrangements in which line contacts are defined by cylindrical components in contact with plates or grooves.

Figure 9:
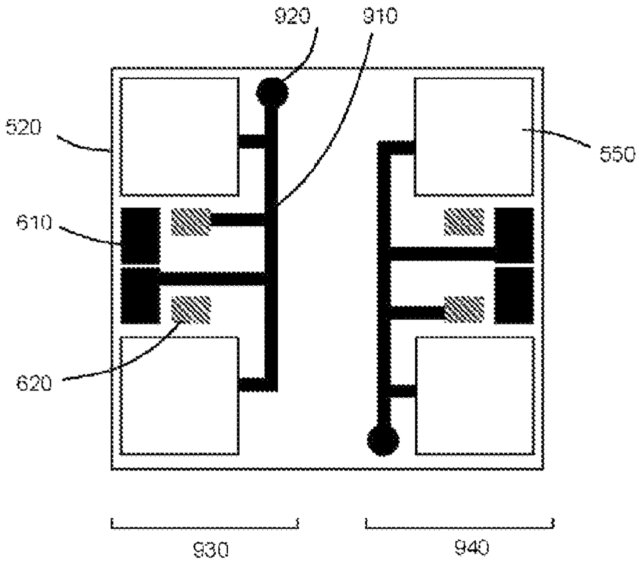
FIG. 9 shows how the rods may be electrically connected using tracks on each of the dies.

Each of the rods requires an electrical connection. This is conveniently achieved using integrated conductive tracks as indicated in FIG. 9. A single die 520 is shown in plan view to reveal the connections between rod mounts. The tracks 910 are formed by metal deposition using a suitable mask, or by selective etching of silicon in the case of a bonded silicon-on-glass substrate. The four connections are separated into two pairs 930, 940, and the spacers 550 are used to make electrical connections between top and bottom dies. If the spacers are of the form shown in FIG. 8, the pads, adhesive, and balls must all be conductive. With the tracks laid as shown, the required sequence of pair-wise connections between alternate rods is maintained when a second identical die is turned over and presented to the first. Connections to the rf power supply are made using the bond pads 920. Although the completed structure has four such pads, two of these are redundant, and are resultant from the process used to fabricate each of the two dies as identical structures.

Figure 10:
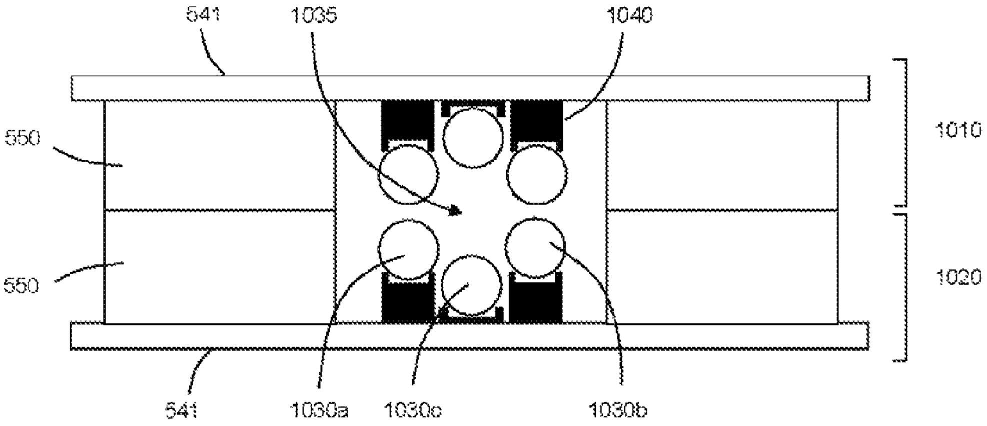
FIG. 10 shows a modification to provide a hexapole arrangement.

FIG. 10 shows a modification of the mounting arrangement for provision of a hexapole configuration. The same reference numerals are used for similar components. Individual rods are seated within their own mounts, which are fabricated through an etching of a silicon substrate. In this arrangement, each of the first 1010 and second 1020 dies provides mountings 1040 for three rods, such that when the two dies are brought together, six rods are arranged circumferentially about an ion beam axis 1035, and individual ones of the supported rods can be considered as displaced laterally and vertically relative to other ones of the supported rods. The dies are spaced apart from one another using the same spacer arrangement as has been described with reference to FIG. 5.

In this hexapole configuration, as there are fewer rods to be accommodated on each die than were required for the octupole configuration, the individual mounts do not require axial separation along the longitudinal axis of the rods. Each of the three rods are located on a trench support, two 1030*a*, 1030*b* being elevated relative to the third 1030*c* which is provided therebetween.

It will be appreciated that the arrangement of FIG. 10, if fabricated using silicon bonded to glass, requires the engagement surfaces of the mounts 1040 to be accurately defined at two different levels within the same silicon layer. Accurate structures can be produced in silicon by exploiting the planarity of the as-purchased polished silicon wafer and the verticality of features etched using, for example, deep reactive ion etching. The bottom of any trench produced by etching is, however, much less well defined. If the silicon components in FIG. 10 are etched from a single, thick silicon wafer bonded to the glass substrate 541, then the uppermost mounts may be accurately formed. However, the lower mounts are defined by the bottom of an etched trench, and will consequently be poorly defined. In an alternative approach, a thin silicon wafer is first bonded to the substrate 541, and then etched to create the lower mounts. A second thicker wafer is subsequently bonded to the substrate and then etched to create the upper mounts. However, it is not trivial to protect the lower mounts during this final etch step.

Figure 11:
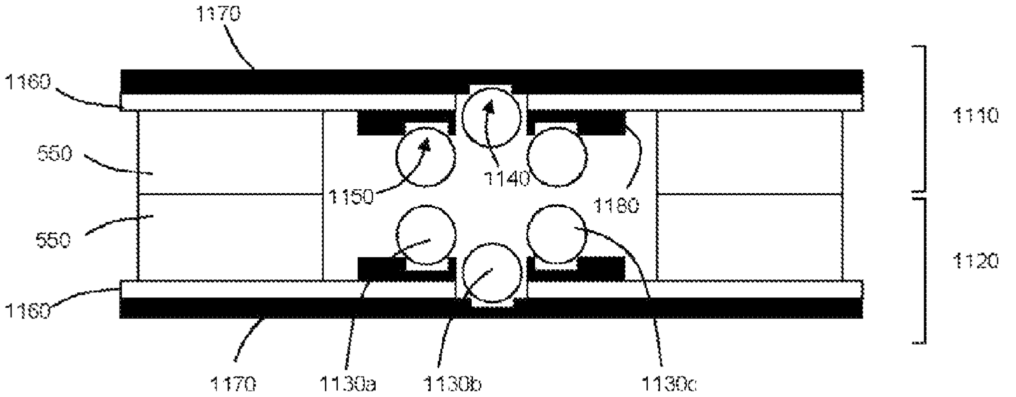
FIG. 11 shows a further modification to provide a hexapole arrangement using a bonded silicon-glass-silicon substrate.

FIG. 11 shows a mounting arrangement that avoids the need for mounts of two different heights within the same silicon layer. Each of the dies 1110, 1120, is fabricated using a three-layer silicon-glass-silicon substrate, and provides mountings 1140, 1150 for three rods. The inner silicon layer 1180 provides trench supports 1150 that locate two of the rods 1130*a*, 1130*c*, while the outer silicon layer 1170 provides a trench support 1140 to locate the third rod 1130*b*. A hole must be cut in the glass layer 1160 to allow access to the trench in the outer silicon layer.

Figure 12:
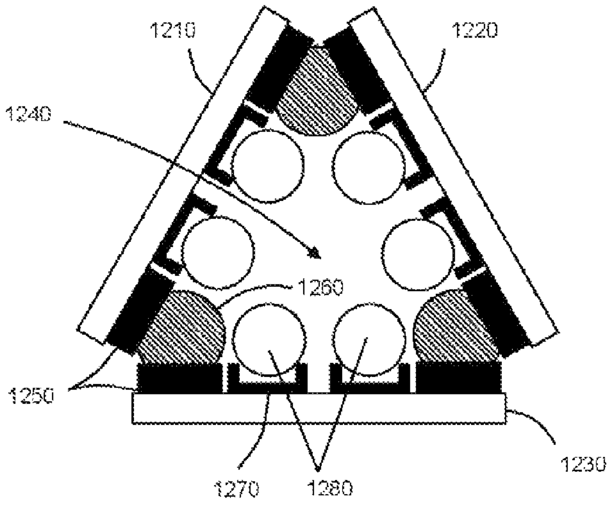
FIG. 12 shows an alternative modification to provide a hexapole arrangement using three dies.

An alternative mounting arrangement for provision of a hexapole configuration is shown in FIG. 12. Each of the first 1210, second 1220, and third 1230 dies provides mountings 1270 for two rods 1280, such that when the three dies are brought together, six rods are circumferentially arranged about an ion beam axis 1240. In this configuration, first, second and third sets of rods are provided. The required separation and registry is maintained using balls 1260 held in sockets 1250 as described previously in relation to FIG. 8, again providing a coupling between the respective dies defined by annular line contacts.

It will be understood that the mounting arrangements described herein are exemplary of the type of configurations that could be employed in fabrication of a microengineered ion guide. It will also be apparent to the person of skill in the art that other arrangements of 10, 12, 14, etc. rods can be accommodated by simple extension of the above designs. Moreover, odd numbers of rods can be accommodated using different upper and lower die.

While the specifics of the mass spectrometer have not been described herein, a miniature instrument such as that described herein may be advantageously manufactured using microengineered instruments such as those described in one or more of the following co-assigned US applications: U.S. patent application Ser. No. 11/032,546, U.S. patent application Ser. No. 12/220,321, U.S. patent application Ser. No. 10/522,638, U.S. patent application Ser. No. 12/001,796, and U.S. patent application Ser. No. 11/810,052, the contents of which are incorporated herein by way of reference. As has been exemplified above with reference to silicon etching techniques, within the context of the present invention, the term microengineered or microengineering or micro-fabricated or micro fabrication is intended to define the fabrication of three dimensional structures and devices with dimensions in the order of millimeters or sub-millimeter scale.

Where done at the micrometer scale, it combines the technologies of microelectronics and micromachining. Microelectronics allows the fabrication of integrated circuits from silicon wafers whereas micromachining is the production of three-dimensional structures, primarily from silicon wafers. This may be achieved by removal of material from the wafer, or addition of material on or in the wafer. The attractions of microengineering may be summarised as batch fabrication of devices leading to reduced production costs, miniaturisation resulting in materials savings, miniaturisation resulting in faster response times and reduced device invasiveness. It will be appreciated that within this context the term "die" as used herein may be considered analogous to the term as used in the integrated circuit environment as being a small block of semiconducting material, on which a given functional circuit is fabricated. In the context of integrated circuits fabrication, large batches of individual circuits are fabricated on a single wafer of a semiconducting material through processes such as photolithography. The wafer is then diced into many pieces, each containing one copy of the circuit. Each of these pieces is called a die. Within the present context such a definition is also useful but it is not intended to limit the term to any one particular material or construct in that different materials could be used as supporting structures for rods of the present teaching without departing from the scope herein defined. For this reason the reference to "die" herein is exemplary of a substrate that may be used for supporting and/or mounting the rods and alternative substrates not formed from semiconducting materials may also be considered useful within the present context. The substrates are substantially planar having a major surface. The rods once supported on their respective substrates are configured so as to extend in a plane substantially parallel with the substrate major surface.

Wide varieties of techniques exist for the microengineering of wafers, and will be well known to the person skilled in the art. The techniques may be divided into those related to the removal of material and those pertaining to the deposition or addition of material to the wafer. Examples of the former include:

Wet chemical etching (anisotropic and isotropic)
Electrochemical or photo assisted electrochemical etching
Dry plasma or reactive ion etching
Ion beam milling
Laser machining
Excimer laser machining
Electrical discharge machining Whereas examples of the latter include:

Evaporation
Thick film deposition
Sputtering
Electroplating
Electroforming
Moulding
Chemical vapour deposition (CVD)
Epitaxy While exemplary arrangements have been described herein to assist in an understanding of the present teaching it will be understood that modifications can be made without departing from the spirit and or scope of the present teaching. To that end it will be understood that the present teaching should be construed as limited only insofar as is deemed necessary in the light of the claims that follow.

Furthermore, the words comprises/comprising when used in this specification are to specify the presence of stated features, integers, steps or components but does not preclude the presence or addition of one or more other features, integers, steps, components or groups thereof.

What is claimed is:

1. A microengineered multipole rod assembly for use as an ion guide, the assembly comprising:
- a plurality of electrified rods arranged circumferentially about, and equidistant from, a common axis;
- first and second substrates coupled by structures other than the electrified rods;
- electrical connections from a waveform generator to the rods;
- wherein each rod is mounted on only one of the substrates without passing through either substrate, the rods have the same cross-sectional profiles, each substrate supports at least two rods, and the longitudinal axes of at least two of the rods mounted on a single substrate are at different mean distances from the substrate plane;
- wherein the first and second substrates are coupled together to form a sandwich structure; and
- wherein a relative positioning of the two substrates is defined and maintained by kinematic or quasi-kinematic couplings.

2. The assembly of claim 1 comprising at least four rods.

3. The assembly of claim 1 wherein the rods define a quadrupole.

4. The assembly of claim 1 wherein the rods define a hexapole.

5. The assembly of claim 1 wherein the rods define an octupole.

6. The assembly of claim 1 wherein each of the rods is supported by individual mounting structures.

7. The assembly of claim 6 wherein each rod is supported by two mounting structures.

8. The assembly of claim 6 wherein the longitudinal positions of the mounting structures supporting one rod are displaced relative to the longitudinal positions of the corresponding mounting structures supporting another rod.

9. The assembly of claim 6 wherein the engagement surface of at least one of the mounting structures has a trench contour, at least a portion of the supported rod being received within the trench.

10. The assembly of claim 6 wherein the engagement surface of at least one of the mounting structures has a step contour, a tread and riser of the step being parallel and perpendicular to the substrate plane, respectively.

11. The assembly of claim 6 wherein contact surfaces of at least one of the mounting structures are substantially perpendicular.

12. The assembly of claim 1 wherein each substrate is configured with four rods arranged relative to one another such that two rods are supported proximally to the substrate by trench mounting structures and two other rods are supported further from the substrate by step mounting structures.

13. The assembly of claim 6 wherein the rods are adhered to their respective mounting structures using an adhesive.

14. The assembly of claim 6 wherein the adhesive is an electrical conductor.

15. The assembly of claim 1 wherein the substrates comprise a silicon-on-glass structure.

16. The assembly of claim 15 wherein the rods are held by silicon mounting structures bonded to a glass substrate.

17. The assembly of claim 16 wherein the silicon mounting structures are fabricated by selective etching.

18. The assembly of claim 1 wherein each of the substrates is fabricated using a three-layer silicon-glass-silicon substrate, a first layer of silicon being configured to support at least a first rod and a second layer of silicon being configured to support at least a second rod.

19. The assembly of claim 18 wherein the first layer of silicon is configured to support two rods and the second layer of silicon supports a third rod of the plurality of rods, the rods being supported in trench mounting structures.

20. The system of claim 17 wherein the glass layer defines a hole providing access to the second layer of silicon.

21. The assembly of claim 1 wherein the couplings are effected by contact of an arcuate surface with a flat surface, v-groove, surfaces defining an aperture, or a cone through a line or point contact.

22. The assembly of claim 1 wherein a positioning of the rods mounted on the first substrate relative to the rods mounted on the second substrate is only defined with respect to each of the degrees of freedom by contact of at least one arcuate surface with a flat surface, v-groove, surfaces defining an aperture, or a cone.

23. The assembly of claim 1 wherein at least one of the couplings is effected by a ball that engages with a first socket on the first substrate and a second socket on the second substrate.

24. The assembly of claim 1 wherein conductive wires are bonded to the substrates for the purpose of providing electrical connections to the mounting structures.

25. A mass spectrometer system comprising:
- an ion guide in an ion guide chamber; and
- a mass analyzer in a mass analyzer vacuum chamber;
- wherein the ion guide comprises:

a plurality of electrified rods arranged circumferentially about, and equidistant from, a common axis;

first and second substrates coupled by structures other than the electrified rods;

electrical connections from a waveform generator to the rods;

wherein each rod is mounted on only one of the substrates without passing through either substrate, the rods have the same cross-sectional profiles, each substrate supports at least two rods, and the longitudinal axes of at least two of the rods mounted on a single substrate are at different mean distances from the substrate plane;

wherein the first and second substrates are coupled together to form a sandwich structure; and wherein a relative positioning of the two substrates is defined and maintained by kinematic or quasi-kinematic couplings.

* * * * *